United States Patent
Lee (10) Patent No.: US 8,150,200 B2
(45) Date of Patent: Apr. 3, 2012

(54) APPARATUS AND METHOD FOR REDUCING IMAGE NOISE WITH EDGE TRACKING AND COMPUTER READABLE MEDIUM HAVING STORED THEREON COMPUTER EXECUTABLE INSTRUCTIONS FOR PERFORMING THE METHOD

(75) Inventor: Young-Sin Lee, Seoul (KR)

(73) Assignee: Core Logic, Inc., Seoul (KR)

( * ) Notice: Subject to any disclaimer, the term of this patent is extended or adjusted under 35 U.S.C. 154(b) by 1006 days.

(21) Appl. No.: 12/151,080

(22) Filed: May 2, 2008

(65) Prior Publication Data
US 2008/0285883 A1   Nov. 20, 2008

(51) Int. Cl.
*G06K 9/40*     (2006.01)
*G06K 9/48*     (2006.01)
*G09G 5/00*     (2006.01)

(52) U.S. Cl. ........ 382/266; 382/199; 382/263; 382/269; 382/274; 345/611; 345/616

(58) Field of Classification Search .......... 382/199, 382/263, 266, 269, 274; 345/611, 616
See application file for complete search history.

(56) References Cited

U.S. PATENT DOCUMENTS

| 5,883,983 | A  | * | 3/1999  | Lee et al. ............. | 382/268 |
| 7,612,784 | B2 | * | 11/2009 | Oka .................... | 345/615 |
| 7,657,098 | B2 | * | 2/2010  | Lin et al. ............ | 382/199 |
| 2008/0025630 | A1 | * | 1/2008 | Hofman et al. ....... | 382/260 |

* cited by examiner

*Primary Examiner* — Brian Q Le
*Assistant Examiner* — Jose M Torres
(74) *Attorney, Agent, or Firm* — The Nath Law Group; Jerald L. Meyer; Stanley N. Protigal (57) ABSTRACT

A method for reducing image noise with edge tracking comprises receiving input of an object image data for conversion and a size data of a matrix, namely, a conversion area of the image data; calculating a statistical difference value between each pixel of the image data and a pixel adjacent to the pixel in a predetermined direction and calculating edge map data obtained from the calculation in each predetermined direction; and converting an object pixel for conversion of the image data using calculation pixels located in the matrix of the image data, wherein the conversion step outputs main calculation pixels, namely, calculation pixels having a statistical difference value below a predetermined level with a value of the object pixel among the calculation pixels based on the edge map data, and converts the object pixel using a statistical calculation value of the main calculation pixels.

17 Claims, 4 Drawing Sheets

APPARATUS AND METHOD FOR REDUCING IMAGE NOISE WITH EDGE TRACKING AND COMPUTER READABLE MEDIUM HAVING STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0042402, filed on May 2, 2007, in the Korean Intellectual Property Office, the entire contents of which are hereby incorporated by reference.

TECHNICAL FIELD

The present invention relates to apparatus and method for reducing noise of an input image, and in particular, to apparatus and method for reducing effectively noise and preserving an edge information of an input image by converting an object pixel using pixels not corresponding to an edge area of the input image.

BACKGROUND

Human beings use various channels and media to obtain information. Among sense organs of a human body, the eye plays the most important role as an entrance for perceiving and receiving information. According to statistics, it is known that about 70% of the perceived and received information is obtained through a sense of vision among the human senses (vision, hearing, smell, taste and touch).

In the past, the perceived and received information was generally transmitted through a medium of letter. However, with a rapid development of computers and transmission media, image information by an image media holds the most important part as an object and subject in information communications of a modern society.

As information communication techniques develop in an aspect of hardware, various techniques also develop to transmit image information more rapidly and effectively. And, many methods are disclosed to satisfy various objects of image processing.

The image processing includes feature extraction, image enhancement, image restoration, image reconstruction, image analysis, image recognition and image compression. In particular, in recent days, the image processing has an interest in a method for reducing noise that may occur during image compression and processing involved in transmission of image information or during transmission of image information.

Various methods were introduced to reduce noise according to purpose and utility, however conventional methods reduce noise only in consideration of simple average or deviation of pixels adjacent to an object pixel for noise reduction.

A mean filter used typically in reducing noise is cited as an instance.

TABLE 1

| 1 | 2 | 7  | 50 | 57 |
|---|---|----|----|----|
| 2 | 5 | 8  | 45 | 52 |
| 3 | 4 | 10 | 51 | 53 |
| 4 | 5 | 10 | 42 | 49 |
| 3 | 3 | 8  | 59 | 61 |

As shown in the above Table 1, assuming that an input image is a 5×5 image and a pixel value is brightness (the larger a pixel value is, the higher brightness is), when a pixel located at the $3^{rd}$ row and $3^{rd}$ column from the upper left cell is an object pixel for mean filtering and a filtering area is a 3×3 matrix, a value of the object pixel, '10' is converted into an average value of pixels located in the 3×3 matrix around and including the object pixel, i.e. (5+8+45+4+10+51+5+10+42)/9=20.

The matrix of image data experiences an abrupt change of brightness value in the $3^{rd}$ and $4^{th}$ columns, and thus the image has an edge. However, the conventional method decreases brightness of the $3^{rd}$ column having relatively higher brightness and increases brightness of the $4^{th}$ column having relatively lower brightness. As a result, sharpness of the edge is inevitably lowered.

And, because the conventional method uniformly uses simple average and location information of the adjacent pixels, incidental errors may continuously occur during calculation and further noise may occur even after application of an algorithm.

In other words, the conventional method disregards a unique information of a corresponding pixel such as brightness, hue or saturation, and converts a value of the corresponding pixel into an average value of adjacent pixels. In this case, noise is somehow reduced, however a pixel corresponding to an edge is also converted into the average value, which results in reduced sharpness of an image.

Synthetically judging, generally the conventional method does not consider information of a corresponding pixel, such as brightness, hue, edge or location when reducing noise or a false color of an image, and thus has a disadvantage of loss of the above-mentioned information.

Further, in the case of a digital image is generated using various contemporary digital cameras and mobile phones on the market, various erroneous information may occur to image information, for example noise occurring in setting a high ISO (International Standards Organization) value to increase sensitivity in a dark environment, noise caused by excessive compression or noise occurring due to dust of a lens or sensor (CMOS (Complementary Metal Oxide Semiconductor) or CCD (Charged Coupled Device)). Therefore, it requires to reduce noise and minimize the loss of a unique information of an image.

SUMMARY

The present invention was devised to solve the above-mentioned problems. An object of the present invention is to provide apparatus and method for reducing effectively noise and minimizing the loss of color or contour information essential to image recognition.

And, another object of the present invention is to provide a computer readable medium stored thereon computer executable instructions for performing the above-mentioned method.

These and other features, aspects, and advantages of the present invention will be more fully described in the preferred embodiments of the present invention. And, the objects and advantages of the present invention can be implemented by embodiments recited in the claims singularly or in combination.

To achieve the above-mentioned objects, an apparatus for reducing noise with edge tracking according to the present invention comprises a first input unit for receiving input of an object image data for conversion; an edge map output unit for calculating a statistical difference value between each pixel of the image data and a pixel adjacent to the pixel in a predetermined direction and outputting edge map data obtained from the calculation in each predetermined direction; a second input unit for receiving input of a size data of a matrix, namely, a conversion area of the image data; and a converting unit for converting an object pixel for conversion of the image data using calculation pixels, where the calculation pixels are located in the matrix of the image data, wherein the converting unit outputs main calculation pixels among the calculation pixels where, based on the edge map data, a statistical difference value between a main calculation pixel and the object pixel is below a predetermined level, and converting the object pixel using a statistical calculation value of the main calculation pixels.

And, the converting unit may include a search unit for setting the object pixel as a first pixel and outputting and storing a second pixel, namely, a calculation pixel having a largest value among calculation pixels having a value smaller than an edge standard value, namely, a standard for edge judgment in the calculation pixels adjacent to the first pixel based on the edge map data outputted in each predetermined direction, setting the second pixel as a first pixel and performing a second pixel output and storage, and repeating the said step to search the matrix; a path control unit for storing values of the second pixels outputted in the search unit and a search path to prevent repetition of the same second pixel; and a first conversion unit for setting the second pixels stored in the path control unit as main calculation pixels and converting the object pixel using a statistical calculation value of the main calculation pixels.

And, preferably the main calculation pixels include the object pixel.

Further, the statistical calculation value may be an average value of the main calculation pixels, and preferably the statistical calculation value may be obtained such that the object pixel is multiplied by a largest weight value, each main calculation pixel is multiplied by a weight value provided differentially according to a spaced distance from the object pixel, and the results of the multiplications are averaged.

Additionally, the edge map output unit may be configured to output an edge map using at least one information selected from the group consisting of Y, Cb and Cr of a pixel in the input image data. Preferably, the first conversion unit is configured to convert the object pixel using a statistical calculation value of the main calculation pixels except main calculation pixels that have a statistical difference value of at least a predetermined level with the object pixel and that are at least a predetermined distance away from the object pixel. Preferably, the above-mentioned predetermined direction includes upper, lower, left and right directions.

Meanwhile, to achieve the above-mentioned objects, a method for reducing image noise with edge tracking comprises an input step for receiving input of an object image data for conversion and a size data of a matrix, namely, a conversion area of the image data; an edge map output step for calculating a statistical difference value between each pixel of the image data and a pixel adjacent to the pixel in a predetermined direction and outputting edge map data obtained from the calculation in each predetermined direction; and a conversion step for converting an object pixel for conversion of the image data using calculation pixels located in the matrix of the image data, wherein the conversion step outputs main calculation pixels, namely, calculation pixels having a statistical difference value below a predetermined level with a value of the object pixel among the calculation pixels based on the edge map data, and converts the object pixel using a statistical calculation value of the main calculation pixels.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Prior to the detailed description of the present invention, terms or definition necessary to understand the present invention are described.

Generally, a color space of an image, essential to image processing may be expressed variously, for example RGB (Red, Green, Blue), CMYK (Cyan, Magenta, Yellow, Key (Black)), HS-family, CIE (The Commission Internationale d'Eclairage) or Y-family, depending on point of view such as point of view toward color mixture or similarity to a visual system of human beings, and may be converted into another kind of color space by a simple mathematical conversion formula.

And, an input image includes a plurality of pixels, and each pixel has its unique image information (brightness, hue, saturation and so on). Generally, the image information has values of 0 to 255 and is indicated as information of 8 bit. However, in alternative embodiments, the image information may be indicated as information of 10 bit or 12 bit depending on application conditions.

Therefore, it should be understood that a color space coordinate system used as an example in the present invention may be applicable to another color space coordinate system equally or similarly, and a bit size of image information of a pixel in an input image is just an example of the present invention for illustration.

Figure 1:
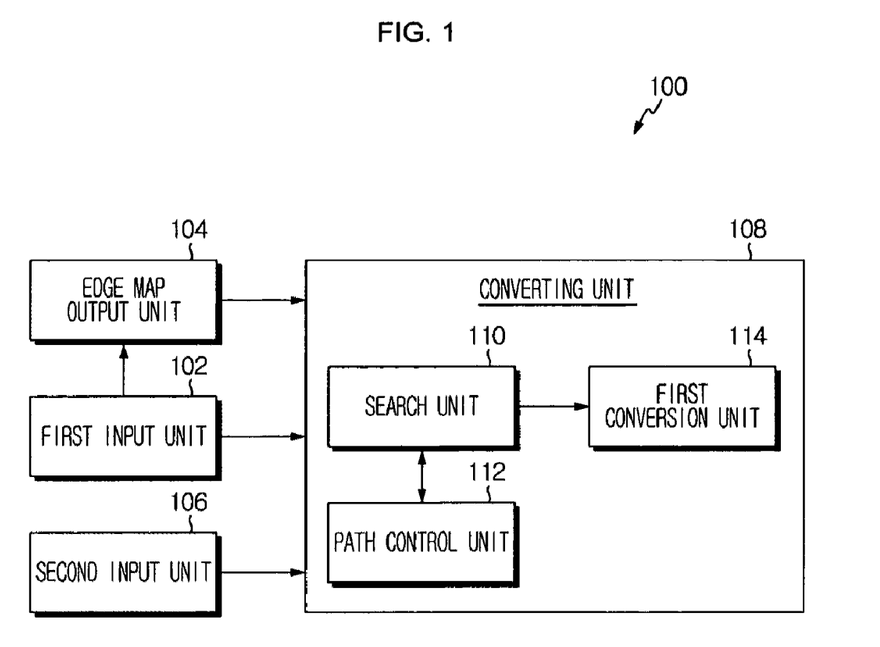
FIG. 1 is a block diagram illustrating an apparatus for reducing image noise with edge tracking according to a preferred embodiment of the present invention.
Figure 2:
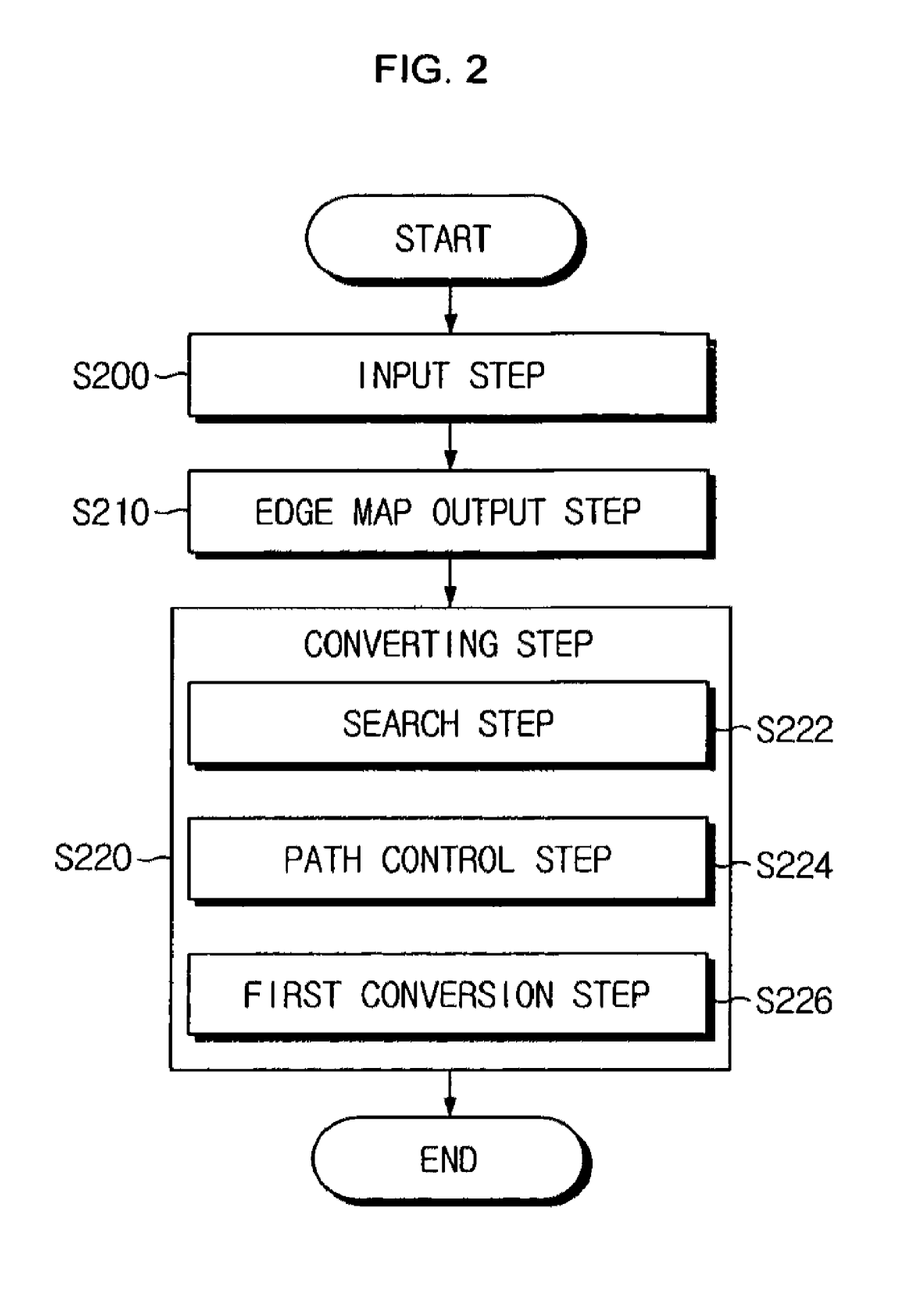
FIG. 2 is a flow chart illustrating a method for reducing image noise with edge tracking according to a preferred embodiment of the present invention.
Figure 3:
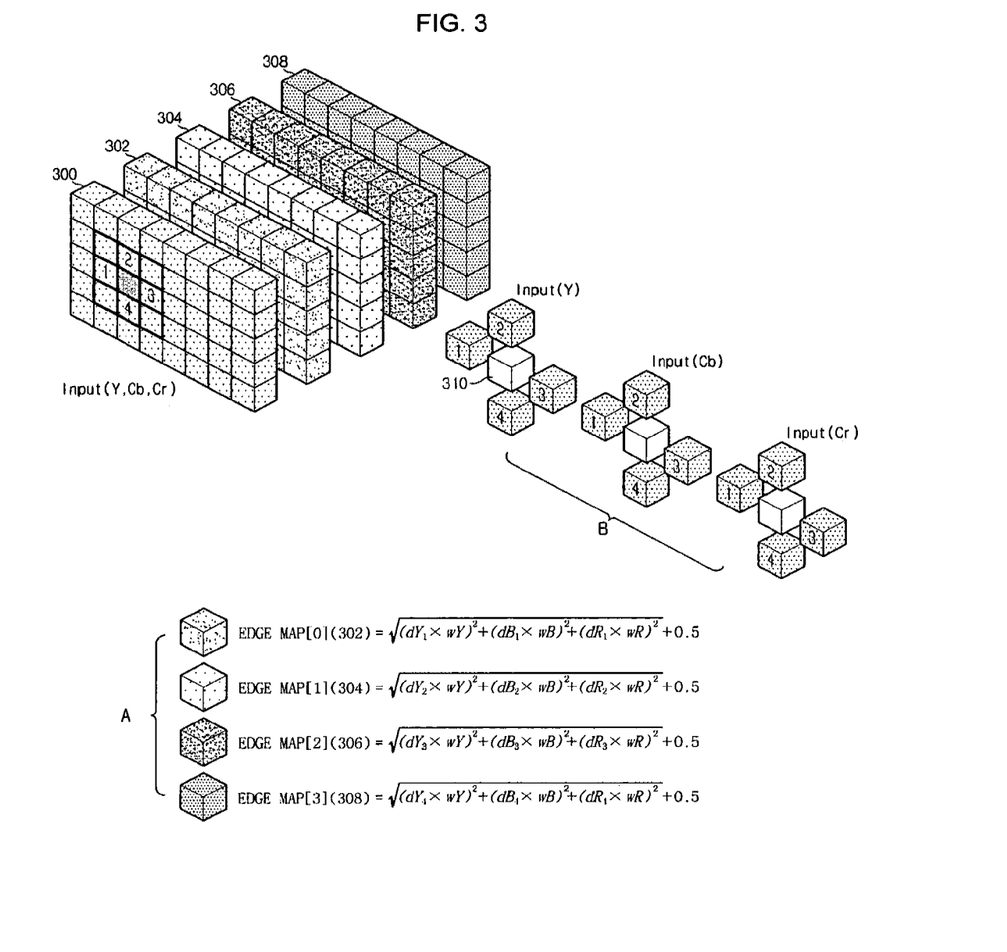
FIG. 3 is a view illustrating a configuration of an edge map used in the apparatus and method for reducing image noise with edge tracking according to the present invention.

FIG. 1 is a block diagram illustrating an apparatus for reducing image noise with edge tracking according to a preferred embodiment of the present invention, FIG. 2 is a flow chart illustrating a method for reducing image noise with edge tracking according to a preferred embodiment of the present invention, and FIG. 3 is a view illustrating a configuration of an edge map used in the apparatus and method for reducing image noise with edge tracking according to the present invention.

The apparatus 100 for reducing image noise with edge tracking according to the present invention comprises a first input unit 102, a second input unit 106, an edge map output unit 104, a converting unit 108, a search unit 110, a path control unit 112 and a first conversion unit 114.

First, the first input unit 102 receives input of an object image data for conversion (S200). As mentioned above, the input image may be an image of various color spaces, however an image of YCbCr is used as an example of the present invention.

And, the second input unit 106 receives input of a size data of a matrix, namely, a conversion area of the image data (S200). Information about the matrix may be additionally inputted or be configured in the form of storage in the apparatus 100 depending on application conditions, and various application examples are possible.

The edge map output unit 104 calculates a statistical difference value between each pixel of the image data and a pixel adjacent to the pixel in a predetermined direction, and outputs an edge map data obtained from the calculation in each predetermined direction (S210).

Generally, the image data has a matrix of rows and columns, a cell where a row and a column intersect is called a pixel, and the pixel has a unique value. An image is recognized as an analogue data by a sense of vision, however the image is, in practice, a digital image organized in the form of a matrix including many discrete pixels.

As shown in the following Table 2, a specific pixel is surrounded by eight adjacent pixels in upper, lower, left, right, upper left, upper right, lower left and lower right directions. The edge map shows a difference value between the object pixel and an adjacent pixel, and is used to judge characteristics (for example, an edge) of the image.

TABLE 2

| UPPER LEFT | UPPER | UPPER RIGHT |
|---|---|---|
| LEFT | OBJECT PIXEL | RIGHT |
| LOWER LEFT | LOWER | LOWER RIGHT |

A large difference value between the object pixel and an adjacent pixel means that the pixel has larger change in pixel value with the corresponding adjacent pixel than with the other adjacent pixels, which may be inferred as edge formation. Generally, if a difference value is larger than a predetermined standard value, it is judged as an edge.

Referring to FIG. 3 illustrating a configuration of the above-mentioned edge map, a reference numeral 300 is an input image, and in the case that a predetermined direction includes four directions, the edge map includes a first direction edge map 302, a second direction edge map 304, a third direction edge map 306 and a fourth direction edge map 308.

The edge map is configured in the form of a matrix having the same size as the input image, and includes edge maps as much as a predetermined number of directions. FIG. 3 shows four edge maps as an example of the present invention, however, eight edge maps may be formed depending on setting conditions.

As shown in section B of FIG. 3, the edge map may be formed individually each information of a pixel, i.e. Y, Cb and Cr or be formed using at least one information selected from the group consisting of Y, Cb and Cr. That is, the edge map may be formed according to information to be processed concentratively in the image data.

Section A of FIG. 3 shows a specific concrete mathematical formula, through which a pixel value of an edge map data of a corresponding pixel in the image data is calculated. In the section A, the edge map was formed using all of Y, Cb and Cr information, and calculation was made by multiplying a difference value between the object pixel and an adjacent pixel by a predetermined weight value (wY, wB and wR) each information, squaring the multiplied value each information, extracting a square root of the sum of the squared values, and adding a predetermined weight value to the resultant value.

Various modifications or omission may be applicable to the weight values of multiplication and addition depending on conditions of a system or apparatus or application conditions.

In the section A, it means that $dY_1 = Y_o - Y_1$, $dB_1 = Cb_o - Cb_1$, $dR_1 = Cr_o - Cr_1$, $dY_1 = Y_o - Y_1$, $dB_2 = Cb_o - Cb_2$, $dR_2 = Cr_o - Cr_2 \ldots$, wherein a subscript "o" is an object pixel.

The edge map stores all difference values between each pixel of the input image and pixels adjacent to the pixel in upper, lower, left and right directions, and thus is utilized in a subsequent calculation as a standard data for judging a difference in pixel value between each pixel and the adjacent pixels.

Hereinafter, output of the edge map data is described using a 9×9 input image of the following Table 3a. For efficient description and avoidance of repetitive description, edge map data of upper and left directions of the 9×9 input image having only brightness information is cited as an instance.

Here, an input image having different size from that of the below-mentioned example or a technique through hue information other than brightness information is just a simple expansion of the below-mentioned example, and thus it should be understood that such variations are included in the scope of the present invention.

TABLE 3a

| 3 | 2 | 3 | 4 | 10 | 13 | 14 | 3 | 7 |
|---|---|---|---|---|---|---|---|---|
| 3 | 5 | 23 | 24 | 23 | 23 | 24 | 2 | 9 |
| 7 | 5 | 22 | 29 | 28 | 27 | 25 | 4 | 11 |
| 5 | 3 | 25 | 23 | 33 | 31 | 26 | 5 | 19 |
| 5 | 6 | 32 | 26 | 40 | 29 | 26 | 6 | 20 |
| 6 | 7 | 25 | 26 | 32 | 23 | 30 | 2 | 11 |
| 5 | 6 | 27 | 28 | 29 | 26 | 25 | 1 | 13 |
| 6 | 7 | 29 | 30 | 26 | 25 | 24 | 2 | 14 |
| 2 | 5 | 6 | 11 | 9 | 8 | 6 | 6 | 15 |

TABLE 3b

| 0 | 0 | 0 | 0 | 0 | 0 | 0 | 0 | 0 |
|---|---|---|---|---|---|---|---|---|
| 0 | 3 | 20 | 20 | 13 | 10 | 10 | 1 | 2 |
| 4 | 0 | 1 | 5 | 5 | 4 | 1 | 2 | 2 |
| 2 | 2 | 3 | 6 | 5 | 4 | 1 | 1 | 8 |
| 0 | 3 | 7 | 3 | 7 | 2 | 0 | 1 | 1 |
| 1 | 1 | 7 | 0 | 8 | 6 | 4 | 4 | 9 |
| 1 | 1 | 2 | 2 | 3 | 3 | 5 | 1 | 2 |
| 1 | 1 | 2 | 2 | 3 | 1 | 1 | 1 | 1 |
| 4 | 2 | 23 | 19 | 17 | 17 | 18 | 4 | 1 |

TABLE 3c

| 0 | 3 | 20 | 20 | 13 | 10 | 10 | 1 | 2 |
|---|---|----|----|----|----|----|---|---|
| 4 | 0 | 1  | 5  | 5  | 4  | 1  | 2 | 2 |
| 2 | 2 | 2  | 6  | 5  | 3  | 1  | 1 | 8 |
| 0 | 3 | 7  | 3  | 7  | 2  | 0  | 1 | 1 |
| 1 | 1 | 7  | 0  | 8  | 6  | 4  | 4 | 9 |
| 1 | 1 | 2  | 2  | 3  | 3  | 5  | 1 | 2 |
| 1 | 1 | 2  | 2  | 3  | 1  | 6  | 1 | 1 |
| 4 | 2 | 23 | 19 | 23 | 17 | 18 | 4 | 1 |
| 0 | 0 | 0  | 0  | 0  | 0  | 0  | 0 | 0 |

TABLE 3d

| 0 | 1 | 1  | 1 | 6  | 3  | 1 | 11 | 4  |
|---|---|----|---|----|----|---|----|----|
| 0 | 2 | 18 | 1 | 1  | 10 | 1 | 22 | 7  |
| 0 | 2 | 17 | 7 | 1  | 1  | 2 | 21 | 7  |
| 0 | 2 | 22 | 2 | 10 | 2  | 5 | 21 | 15 |
| 0 | 1 | 26 | 6 | 22 | 11 | 3 | 20 | 14 |
| 0 | 1 | 18 | 1 | 6  | 9  | 7 | 28 | 9  |
| 0 | 1 | 21 | 1 | 1  | 3  | 3 | 24 | 12 |
| 0 | 1 | 22 | 1 | 4  | 1  | 1 | 22 | 12 |
| 0 | 3 | 1  | 5 | 5  | 1  | 1 | 0  | 9  |

TABLE 3e

| 1 | 1  | 1 | 6  | 3  | 1 | 11 | 4  | 0 |
|---|----|---|----|----|---|----|----|---|
| 2 | 18 | 1 | 1  | 10 | 1 | 22 | 7  | 0 |
| 2 | 17 | 7 | 1  | 1  | 2 | 21 | 7  | 0 |
| 2 | 22 | 2 | 10 | 2  | 5 | 21 | 15 | 0 |
| 1 | 26 | 6 | 22 | 11 | 3 | 20 | 14 | 0 |
| 1 | 18 | 1 | 6  | 9  | 7 | 28 | 9  | 0 |
| 1 | 21 | 1 | 1  | 3  | 3 | 24 | 12 | 0 |
| 1 | 22 | 1 | 4  | 1  | 1 | 22 | 12 | 0 |
| 3 | 1  | 5 | 5  | 1  | 1 | 0  | 9  | 0 |

In outputting the edge map data, a default value of an edge pixel that does not have an object of comparison is expressed as '0', and a statistical difference value between a pixel and an adjacent pixel is calculated as an absolute value of an arithmetical difference therebetween. However, various modifications may be applied to the statistical difference value as in the section A of FIG. 3.

The above Table 3a shows an input image, and the Tables 3b, 3c, 3d and 3e show an upper direction (second direction) edge map 304, a lower direction (fourth direction) edge map 308, a left direction (first direction) edge map 302 and a right direction (third direction) edge map 306, respectively.

Each of the exemplary edge maps of four directions has a size equal to the input image, and the edge map data can be used to refer to a difference value between a specific pixel and an adjacent pixel.

For a specific example, a value corresponding to a location information (3,3) in the upper direction edge map 304 is '1'. The value '1' means that a difference value between a pixel corresponding to the location information (3,3) and a pixel corresponding to a location information (3,2) adjacent to the (3,3) pixel in an upper direction is '1'. That is, the difference value is a standard for judging an adjacent direction of a specific pixel of the input image and a difference value between the specific pixel and a pixel located in the adjacent direction.

Although the above example shows edge maps of upper, lower, left and right directions, an edge map of at least one direction selected from upper, lower, left, right and four diagonal directions may be formed according to functions such as precision or calculation amount of direction.

After the edge map data is outputted in each predetermined direction as mentioned above, the converting unit 108 of the present invention converts the object pixel for conversion of the image data using calculation pixels, namely, pixels located in the matrix of the image data. The converting unit 108 outputs main calculation pixels, namely, calculation pixels having a statistical difference value below a predetermined level with a value of the object pixel based on the edge map data, and converts the object pixel using a statistical calculation value of the main calculation pixels (S220).

In other words, the converting unit 108 selects only objects similar to the object pixel based on the outputted edge map data, and converts the object pixel using a statistical calculation value of only the selected objects. The above-mentioned conversion outputs only pixels having a high relationship with the object pixel to minimize the loss of a unique information of the object pixel and effectively preserve the unique information.

In the case that the conversion is made through mean filtering by a simple average value used in the prior art, when an object pixel is a pixel corresponding to a location information (3,3) of the input image and an conversion area is a 5×5 matrix, a value of the object pixel is converted into a value of the following Equation 1. However, the present invention outputs main calculation pixels, namely, calculation pixels having a statistical difference value smaller than a predetermined standard with a value of the object pixel, for example, in the case that the predetermined standard is 10, pixels having value smaller than 10, among 25 calculation pixels based on the edge map, and converts the value of the object pixel into a statistical calculation value of the main calculation pixels.

$$\frac{\sum_{i,j=1}^{5} Pij}{25} \qquad \text{Equation 1}$$

For example, the main calculation pixels are pixels corresponding to location information (2,3), (2,4), (2,5), (3,3), (3,4), (3,5), (4,3), (4,4) and (5,4), and thus the value of the object pixel is converted into a statistical calculation value (for example, an average value) of the pixels corresponding to the locations, i.e. 23, 24, 23, 22, 29, 28, 25, 23 and 26 as shown in the following Equation 2.

$$\frac{23+24+23+22+29+28+25+23+26}{9} = 24 \qquad \text{Equation 2}$$

Unlike the above example, a variation example may be schemed, in which the value of the object pixel is not included. However, it is preferable to include the value of the object pixel and reflect it on a value of an object to be converted.

The above example shows a value calculated based on each of the edge maps of four directions, and in the case that direction of the edge map is changed or the number of edge maps is increased or decreased, the statistical calculation value may be changed. As number of direction is increased, calculation gets more precise, and function relationship has higher calculation amount, accordingly.

In the case that precision and calculation amount of direction are both considered, the exemplary edge maps of four directions are the most efficient in such a range that direction is not lost.

And, the conversion area, i.e. matrix may use a selectively applicable value of size that is inputted by a user or preset and stored in the apparatus 100. The precision or calculation amount of direction may be adjusted depending on the size of the matrix.

Specifically, the converting unit 108 includes the search unit 110, the path control unit 112 and the first conversion unit 114.

The search unit 110 sets the object pixel as a first pixel, selects, as a second pixel, a pixel having a largest value among pixels having smaller value than an edge standard value, namely, a standard for edge judgment in the calculation pixels adjacent to the first pixel based on the edge map outputted in each predetermined direction, stores the second pixel, and the search unit 110 sets the second pixel as a first pixel and performs a second pixel selection and storage. The search unit 110 repeats the said step to search the matrix (S222).

In the step S222, the path control unit 112 stores values of the second pixels outputted in the search unit 110 and a search path to prevent repetition of the same second pixel (S224). That is, the path control unit 112 stores information about a start pixel and an end pixel and a search path, and controls to avoid the searched path in the search step.

The steps S222 and S224 are described in detail based on the specific example through the above Tables 2 and 3.

The object pixel (3,3) has values of upper, lower, left and right edge maps of 1, 2, 17 and 7, respectively. That is, there is a pixel having a largest difference value (17) with the object pixel (first pixel) in a left direction, and the difference value is larger than a predetermined standard, i.e. 10, which is judged as an edge in a relative relationship with the object pixel. Thus, the search is not performed in the left direction in the search step.

Except the value of the left direction, a next largest difference value among the values on the edge map is '7', and a direction corresponding to '7' is a right direction. That is, a (3,4) pixel corresponding to a value of the right direction, '29' is set as a second pixel, and the value of the second pixel, '29' is stored in a queue. Then, the search step is performed with the (3,4) pixel corresponding to '29' being set as a first pixel.

The (3,4) pixel has values of upper, lower, left and right edge maps of 5, 6, 7 and 1, respectively. When the above-mentioned step is repeated, there is no value larger than 10. Thus, judgment for a direction corresponding to an edge is terminated, and judgment is performed on a next largest value among the above-mentioned values. The next largest value is '7'.

A pixel corresponding to '7' is a pixel of left direction, but search for the left direction was already performed. Thus, the path control unit 112 controls to prevent repetition of search for the same path (S224).

Then, a next largest value is '6' among the other values except the value of the left direction, a pixel corresponding to '6' is a pixel of the lower direction, and a value of the pixel is '23'. Through the above-mentioned step, the pixel corresponding to '23' is set as a second pixel and the second pixel is stored in the queue. The search step is performed on the (4,4) pixel corresponding to '23' based on the edge map. In the case that the path finishes in the conversion area, i.e. matrix or returns to the start pixel (3,3), the search step is completed.

The following Table 4 shows the result that the path is generated based on the object pixel (3,3). As shown in the following Table 4, a 5×5 matrix includes the object pixel (3,3) at the center. Each pixel has three numeral values: an upper numeral value is a pixel value, an intermediate numeral value is a location information data, and a lower numeral value is an order of path search. 'x' means that the path search is exempted.

TABLE 4

| 3 (1.1) x | 2 (1.2) x | 3 (1.3) x | 4 (1.4) x | 10 (1.5) x |
|---|---|---|---|---|
| 3 (2.1) x | 5 (2.2) x | 23 (2.3) ⑥ end | 24 (2.4) ⑦ | 23 (2.5) ⑧ |
| 7 (3.1) x | 5 (3.2) x | 22 (3.3) ① start | 29 (3.4) ② | 28 (3.5) ⑤ |
| 5 (4.1) x | 3 (4.2) x | 25 (4.3) x | 23 (4.4) ③ | 33 (4.5) ④ |
| 5 (5.1) x | 6 (5.2) x | 32 (5.3) x | 26 (5.4) x | 40 (5.5) x |

As shown in Table 4, the path search is performed in the order of 22①→29②→23③→33④→28⑤→23⑥→24⑦→23⑧ (shaded pixels in the above Table 4), and the above-mentioned pixel values are stored as values of second pixels. When the values of second pixels are stored in the queue, the number of second pixels may be adjusted by a user's selection.

As mentioned above, the path control unit 112 stores the values of the second pixels outputted in the search unit 110 (S224), and transmits the stored values to the first conversion unit 114.

The first conversion unit 114 sets the second pixels stored in the path control unit 112 as main calculation pixels, and converts the object pixel using a statistical calculation value of the main calculation pixels (S226).

In other words, a value of the pixel corresponding to location information (3,3) is calculated by the following Equation 3 involved in only the shaded pixels among the pixels located in the matrix as shown in the above Table 4.

$$\frac{22 + 29 + 23 + 33 + 28 + 23 + 24 + 23}{8} = 25.625 = 25 \quad \text{Equation 3}$$

That is, the value of the (3,3) pixel is converted into a statistical calculation value, '25'.

In this step, the object pixel may be excluded from or included in the search result depending on application and utility. As described above, it is preferable to include the object pixel in the search result.

And, to reflect a correlation between the object pixel and the main calculation pixel better, the statistical calculation value is preferably calculated such that the object pixel is provided with a largest weight value and a weight value provided differentially according to a spaced distance of the main calculation pixel from the object pixel is reflected on a value of each main calculation pixel.

A specific example is cited as follows.

In calculating the statistical calculation value of the main calculation pixels, the object pixel is provided with a weight value of 1, and adjacent pixels of upper, lower, left and right directions spaced from the object pixel with a distance of 1 are provided with a weight value of 0.95. In the case that the distance is $\sqrt{2}$, a weight value of 0.90 is provided. In the case that the distance is 2, a weight value of 0.85 is provided. In the case that the distance is $\sqrt{5}$, a weight value of 0.8 is provided. An adjacent pixel spaced from the object pixel with a longest distance of $2\sqrt{2}$ may be provided with a weight value of 0.75.

The weight value is determined according to utility environment, and a specific value of the weight value is just an example of the present invention.

The calculation pixels spaced from the object pixel (3,3) are arranged according to distance as follows.

Pixel having a distance of 1=(3,2) (3,4) (2,3) (4,3) four pixels

Pixel having a distance of $\sqrt{2}$=(2,2) (4,4) (4,2) (2,4) four pixels

Pixel having a distance of 2=(3,1) (3,5) (1,3) (5,3) four pixels

Pixel having a distance of $\sqrt{5}$=(2,1) (1,2) (4,1) (1,4) (5,2) (2,5) (5,4) (4,5) eight pixels Pixel having a distance of $2\sqrt{2}$=(1,1) (5,5) (5,1) (1,5) four pixels In the case that the weight values are reflected as described above, the statistical calculation value is calculated by the following Equation 4.

$$\frac{22 \times 1 + 29 \times 0.95 + 23 \times 0.9 + 33 \times 0.8 + 28 \times 0.85 + 23 \times 0.8 + 24 \times 0.9 + 23 \times 0.95}{8} = 22.7875 = 22 \qquad \text{Equation 4}$$

When the weight values are reflected as described above, the image may have a higher sharpness and preserve edge or hue information of the image better.

And, to reflect a correlation between the spaced distance and the pixel value better, the first conversion step (S226) by the first conversion unit 114 may be configured to calculate a statistical calculation value of only the main calculation pixels except main calculation pixels that have a statistical difference value of at least a predetermined level with the object pixel and that are at least a predetermined distance away from the object pixel.

That is, a spaced distance correlation representing the extent of separation from the object pixel and a pixel value correlation presenting difference value with the object pixel are both reflected, and thus, in the case that a pixel spaced from the object pixel by at least predetermined distance has too large difference value with the object pixel, the first conversion step may be configured to calculate the statistical calculation value while the pixel is exempted from calculation.

The predetermined standards for the spaced distance and the statistical difference value with the object pixel may be inputted by a user or may be preset in the form of storage in the apparatus, and various modifications are possible.

In alternative embodiments, as the spaced distance is increased, higher weight value may be provided. In the case that a pixel value reflected by the weight value is smaller than a predetermined standard, a corresponding pixel may be included in calculation, and in the case that the pixel value is the same or larger than a predetermined standard, the pixel may be exempted from calculation.

Figure 4:
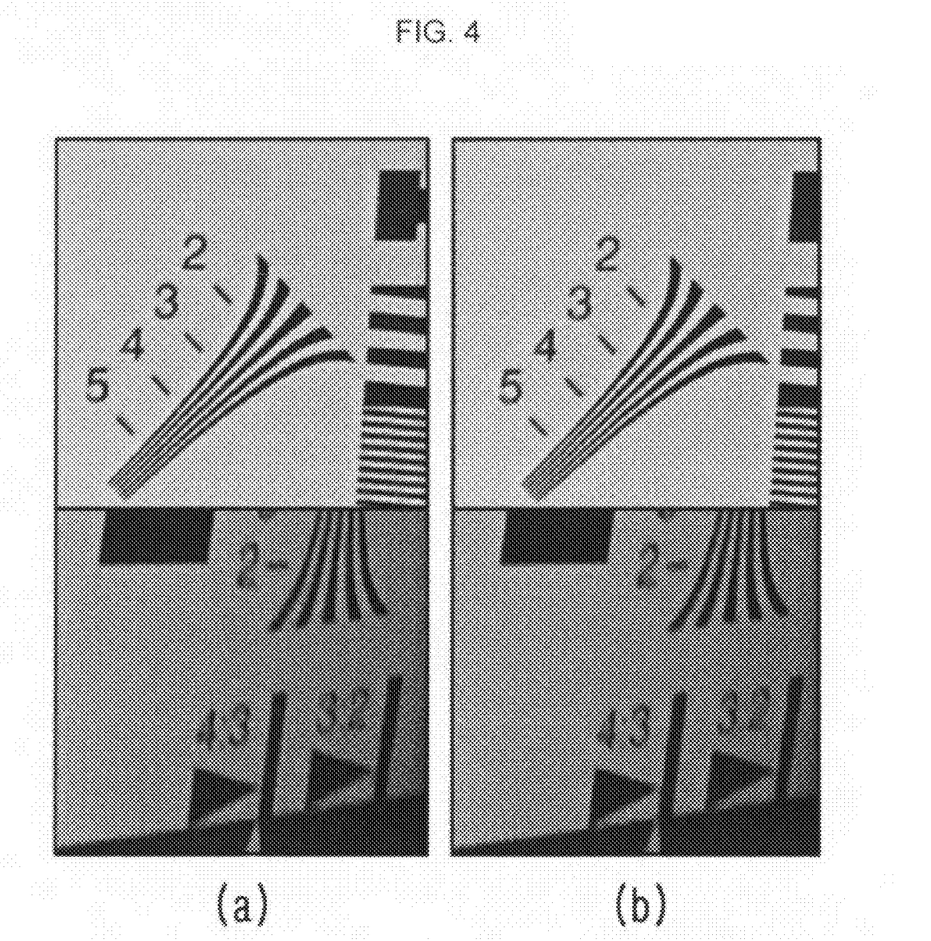
FIG. 4 is a view illustrating results of image data converted by the present invention.

Meanwhile, in FIG. 4 illustrating results of the image data converted by the present invention, (a) is an image before processing, and (b) is an image applied by the apparatus and method for reducing image noise with edge tracking according to the present invention.

As shown in FIG. 4, it is found that the image after processing has higher sharpness, i.e. clearer character and pattern than the image before processing.

The method for reducing image noise with edge tracking according to the present invention may be incorporated as a computer readable code in a computer readable medium. The computer readable medium includes all kinds of storage devices for storing data readable by a computer system. For example, the computer readable medium is ROM, RAM, CD-ROM, a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the method for reducing image noise with edge tracking may be easily inferred by programmers in the prior art.

Only a few implementations and examples are described and other implementations, enhancements and variations can be made based on what is described and illustrated in this application.

The above-mentioned apparatus and method for reducing image noise with edge tracking according to the present invention creates an effect of reducing effectively noise included in an image.

And, the present invention can provide apparatus and method which reduces noise by reflecting a unique property of a pixel of an image data to minimize the loss of information about visual characteristics, specially edge or hue information of the corresponding pixel and the image including the corresponding pixel, and to achieve sharpness improvement and edge enhancement.

Further, the present invention can provide apparatus and method which use various statistical methods and weight values depending on utility environment and application to increase the calculation amount and efficiency of precision according to specification of an apparatus or system to be applied.

What is claimed is:

1. An apparatus for reducing image noise with edge tracking, comprising:
    a first input unit for receiving an object image data for conversion, from an image sensor, wherein the image sensor includes a CMOS sensor and a CCD sensor;
    an edge map output unit for calculating a statistical difference value between each pixel of the image data and a pixel adjacent to the pixel in a predetermined direction, and outputting edge map data obtained from the calculation in each predetermined direction;
    a second input unit for receiving a size data of a matrix where the matrix refers to a conversion area of the image data; and
    a converting unit for converting an object pixel of the image data using calculation pixels, where the calculation pixels are pixels located in the matrix of the image data,
       wherein the converting unit selects main calculation pixels among the calculation pixels where, based on the edge map data, the statistical difference value between a main calculation pixel and the object pixel is below a predetermined level, and converts the object pixel using a statistical calculation value computed from the main calculation pixels, wherein the converting unit includes a search unit for setting the object pixel as a first pixel, outputting and storing a second pixel, namely, a calculation pixel having a largest value among calculation pixels having a value smaller than an edge standard value, namely, a standard for edge judgment in the calculation pixels adjacent to the first pixel based on the edge map data outputted in each predetermined direction, setting the output second pixel as a first pixel, and repeating (1) the outputting and storing step and (2) the setting the output second pixel step to search the matrix; and a path control unit for storing values of the second pixels outputted in the search unit and a search path to prevent a repetition of the same second pixel;

wherein each of the units is configured to include software and hardware.

2. The apparatus for reducing image noise with edge tracking according to claim 1, wherein the converting unit includes:

a first conversion unit for setting the second pixels stored in the path control unit as main calculation pixels, and converting the object pixel using a statistical calculation value of the main calculation pixels.

3. The apparatus for reducing image noise with edge tracking according to claim 1 or 2, wherein the main calculation pixels include the object pixel.

4. The apparatus for reducing image noise with edge tracking according to claim 2, wherein the first conversion unit converts the object pixel using a statistical calculation value of the main calculation pixels excluding main calculation pixels that have a statistical difference value of at least a predetermined level with the object pixel and that are at least a predetermined distance away from the object pixel.

5. The apparatus for reducing image noise with edge tracking according to claim 1, wherein the statistical calculation value is an average value of the main calculation pixels.

6. The apparatus for reducing image noise with edge tracking according to claim 1, wherein the statistical calculation value is obtained such that the object pixel is multiplied by a largest weight value, each main calculation pixel is multiplied by a weight value provided differentially according to a spaced distance from the object pixel, and the results of the multiplications are averaged.

7. The apparatus for reducing image noise with edge tracking according to claim 1, wherein the edge map output unit outputs an edge map using at least one information selected from the group consisting of Y, Cb and Cr of a pixel in the input image data.

8. The apparatus for reducing image noise with edge tracking according to claim 1, wherein the predetermined direction includes upper, lower, left and right directions.

9. A method for reducing image noise with edge tracking, comprising:

an input step for receiving inputs of an object image data for conversion and a size data of a matrix, where the matrix refers to a conversion area of the image data;

an edge map output step for calculating a statistical difference value between each pixel of the image data and a pixel adjacent to the pixel in a predetermined direction, and outputting edge map data obtained from the calculation in each predetermined direction; and a conversion step for converting an object pixel of the image data using calculation pixels, where the calculation pixels are pixels located in the matrix of the image data, wherein the conversion step includes, a step for selecting main calculation pixels among the calculation pixels, where, based on the edge map data, the difference between a main calculation pixel and the object pixel is below a predetermined level, a step for converting the object pixel using a statistical calculation value computed from the main calculation pixels, a search step for setting the object pixel as a first pixel, outputting and storing a second pixel, namely, calculation pixel having a largest value among calculation pixels having a value smaller than an edge standard value, namely, a standard for edge judgment in the calculation pixels adjacent to the first pixel based on the edge map data outputted in each predetermined direction, setting the second pixel as a first pixel, and repeating (1) the outputting and storing sub-step, and (2) the setting the output second pixel sub-step to search the matrix, a path control step for storing values of the second pixels output in the search step and a search path to prevent repetition of the same second pixel.

10. The method for reducing image noise with edge tracking according to claim 9, wherein the conversion step includes:

a first conversion step for setting the stored second pixels as main calculation pixels, and converting the object pixel using a statistical calculation value of the main calculation pixels.

11. The method for reducing image noise with edge tracking according to claim 10, wherein, in the first conversion step, the object pixel is converted using a statistical calculation value of the main calculation pixels excluding main calculation pixels that have a statistical difference value of at least a predetermined level with the object pixel and that are at least a predetermined distance away from the object pixel.

12. The method for reducing image noise with edge tracking according to claim 9, wherein the main calculation pixels include the object pixel.

13. The method for reducing image noise with edge tracking according to claim 9, wherein the statistical calculation value is an average value of the main calculation pixels.

14. The method for reducing image noise with edge tracking according to claim 9, wherein the statistical calculation value is obtained such that, the object pixel is multiplied by a largest weight value, each main calculation pixel is multiplied by a weight value provided differentially according to a spaced distance from the object pixel, and the results of the multiplications are averaged.

15. The method for reducing image noise with edge tracking according to claim 9, wherein, in the edge map output step, an edge map is outputted using at least one information selected from the group consisting of Y, Cb and Cr of a pixel in the input image data.

16. The method for reducing image noise with edge tracking according to claim 9, wherein the predetermined direction includes upper, lower, left and right directions.

17. A non-transitory computer readable medium having stored thereon computer executable instructions for performing the method defined in claim 9 or claim 16.

* * * * *